(12) United States Patent
Musso, Jr. et al.

(10) Patent No.: US 6,960,055 B2
(45) Date of Patent: Nov. 1, 2005

(54) CROSS MEMBER-LESS DUMP TRUCK BODY

(75) Inventors: Charles S. Musso, Jr., Hammondsport, NY (US); Tom Musso, Bath, NY (US)

(73) Assignee: Air-Flo Manufacturing Company, Inc., Prattsburg, NY (US)

( * ) Notice: Subject to any disclaimer, the term of this patent is extended or adjusted under 35 U.S.C. 154(b) by 180 days.

(21) Appl. No.: 10/082,740

(22) Filed: Feb. 22, 2002

(65) Prior Publication Data

US 2003/0161710 A1 Aug. 28, 2003

(51) Int. Cl.⁷ .................................................. B60P 1/30
(52) U.S. Cl. ................ 414/528; 296/183.2; 296/184.1; 298/1 B
(58) Field of Search ................................ 414/526–528; 296/182–184; 198/735.3; 298/1 B, 17 R; 239/672, 676

(56) References Cited

U.S. PATENT DOCUMENTS

| | | | | |
|---|---|---|---|---|
| 1,805,489 A | * | 5/1931 | Kerr et al. | ................... 296/184 |
| 2,879,910 A | | 3/1959 | Johnson | |
| 3,049,251 A | * | 8/1962 | Glew | ......................... 414/528 |
| 4,225,281 A | | 9/1980 | Bibeau et al. | |
| 4,273,381 A | * | 6/1981 | Bibeau et al. | .............. 298/1 H |
| 4,557,400 A | | 12/1985 | Clarke | |
| 4,886,214 A | | 12/1989 | Musso, Jr. et al. | |
| 4,995,773 A | * | 2/1991 | Lamoureux et al. | ........ 414/489 |
| 5,085,025 A | * | 2/1992 | Gaddis | ....................... 52/731.7 |
| 5,310,119 A | | 5/1994 | Musso, Jr. et al. | |
| 5,397,172 A | | 3/1995 | Musso, Jr. et al. | |
| 5,400,974 A | | 3/1995 | Musso, Jr. et al. | |
| 5,437,400 A | | 8/1995 | Loeffler | |
| 5,437,499 A | | 8/1995 | Musso | |
| 5,466,112 A | | 11/1995 | Feller | |
| 5,505,583 A | | 4/1996 | Gaddis et al. | |
| 5,662,374 A | | 9/1997 | Wheeler | |
| 5,690,466 A | | 11/1997 | Gaddis et al. | |
| 5,772,389 A | | 6/1998 | Feller | |
| 5,927,617 A | | 7/1999 | Musso, Jr. et al. | |
| 6,092,966 A | | 7/2000 | Martin et al. | |
| 6,179,230 B1 | | 1/2001 | Geroux et al. | |
| 6,186,731 B1 | | 2/2001 | Vickers et al. | |
| 6,200,082 B1 | * | 3/2001 | Molenaar et al. | ........... 414/528 |
| D445,067 S | | 7/2001 | Musso, Jr. et al. | |
| D446,490 S | | 8/2001 | Musso, Jr. et al. | |
| 6,308,900 B2 | | 10/2001 | Geroux et al. | |
| D450,627 S | | 11/2001 | Musso, Jr. et al. | |
| D450,628 S | | 11/2001 | Musso, Jr. et al. | |
| 6,394,735 B2 | * | 5/2002 | Hollinrake et al. | ......... 414/519 |

OTHER PUBLICATIONS

Air–Flo Truck Bodies Flo' N Dump Multi–Purpose Body Brochure, pp. 1–2 (date unknown).
Henderson Manufacturing MUNIBODY, pp. 1–4 (1997).

* cited by examiner

Primary Examiner—Dean J. Kramer
(74) Attorney, Agent, or Firm—George R. McGuire; Bond, Schoeneck & King, PLLC (57) ABSTRACT

A dump truck body including a receptacle defined by a floor and, extending from the floor, first and second side walls on opposite sides of the floor, and a front wall and a tailgate, located on opposite sides of the floor and extending between the side walls. The floor of the dump truck body includes at least one longitudinal support structure which substantially extends from the front wall to the tailgate, a substantially planar support plate attached to the at least one longitudinal support structure, and at least one floor section attached to the at least one longitudinal support structure, without a plurality of longitudinally spaced, transverse supports attached to the at least one floor section, the at least one longitudinal support structure, and the substantially planar support plate. In addition, a conveyor system is attached to the at least one longitudinal support structure, the floor having at least one opening in alignment with the conveyor system.

22 Claims, 12 Drawing Sheets

CROSS MEMBER-LESS DUMP TRUCK BODY

FIELD OF THE INVENTION

This invention relates generally to a dump truck body which includes a conveyor system structurally integrated into the floor of the dump truck body. The dump truck body may include a modified floor structure which eliminates the need for transverse supports attached to its underside or inner curved members for structural support and to facilitate the flow of material within the dump truck body to the conveyor system.

BACKGROUND OF THE INVENTION

Typically, conveyors have been installed in truck bodies to extend between the front wall and the tailgate of the dump body and centrally between the side walls of the truck body. With these longitudinal conveyors, materials in the dump bodies can be conveyed to the front or rear of the dump body to be dispensed. Some examples of these types of trucks are disclosed in U.S. Pat. No. 4,886,214 to Musso, Jr. et al., U.S. Pat. No. 5,310,119 to Musso, Jr. et al., U.S. Pat. No. 5,397,172 to Musso, Jr. et al., U.S. Pat. No. 5,400,974 to Musso, Jr. et al., U.S. Pat. No. 5,437,400 to Musso, Jr. et al., and U.S. Pat. No. 5,437,499 to Musso.

The positioning of a conveyor in the floor of a truck body has required the development of suitable support structures. In particular, when combining a central, longitudinally extending conveyor with a typical truck body, the overall weight of the truck body is significantly increased, especially for wide conveyors which may encompass a third or more of the floor space of the truck body. Further, the additional weight of these conveyors is focused in the center of the truck body floor, away from the support provided by front, rear, and side walls. In order to support the weight of a central, longitudinally extending conveyor, a plurality of cross member supports (i.e. transverse beams) which extend between longitudinally extending channel beams and/or extend from longitudinally extending channel beams to the side walls of the truck body have been necessary. Such support structures are shown, for example, in U.S. Pat. No. 4,886,214 to Musso, Jr. et al. and U.S. Pat. No. 5,400,974 to Musso, Jr. et al.

Although the use of a plurality of cross member supports in combination with channel beams has allowed the positioning of conveyors in the floor of trucks, such cross members add weight to the truck body, thereby decreasing fuel economy, and increase the cost of production of truck bodies. Thus, there is a need for a dump truck body including a central, longitudinally extending conveyor which eliminates the need for a plurality (i.e., two or more) of cross members.

SUMMARY OF THE INVENTION

The present invention relates to a dump truck body including a receptacle defined by a floor and, extending from the floor, first and second side walls on opposite sides of the floor, and a front wall and a tailgate, located on opposite sides of the floor and extending between the side walls. The floor of the dump truck body includes at least one longitudinal support structure which substantially extends from the front wall to the tailgate, a substantially planar support plate attached to the at least one longitudinal support structure, and at least one floor section attached to the at least one longitudinal support structure, without a plurality of longitudinally spaced, transverse supports attached to the at least one floor section, the at least one longitudinal support structure, and the substantially planar support plate. In addition, a conveyor system is attached to the at least one longitudinal support structure, the floor having at least one opening in alignment with the conveyor system.

Another aspect of the present invention relates to a dump truck including a longitudinally extending truck frame, a dump truck body as described above pivotally mounted at a rear end thereof on the truck frame, and a lift system connected between the truck frame and a forward end of the dump body.

The present invention also relates to a dump truck body including a receptacle defined by a floor and, extending from the floor, first and second side walls on opposite sides of the floor, and a front wall and a tailgate, located on opposite sides of the floor and extending between the side walls, wherein the first and second side walls have a first longitudinal edge distal from the floor and a second longitudinal edge proximal to the floor. A longitudinally extending conveyor system is structurally integrated into the floor between the first and second side walls. The dump truck body further includes at least one first curved member having a first end adjacent and in contact with the first longitudinal edge of the first side wall and a second end adjacent and in contact with the floor adjacent the longitudinally extending conveyor system, wherein the at least one first curved member curves downwardly and inwardly toward the conveyor system.

Yet another aspect of the present invention relates to a dump truck including a longitudinally extending truck frame, a dump truck body as described in the previous paragraph pivotally mounted at a rear end thereof on the truck frame, and a lift system connected between the truck frame and a forward end of the dump body.

A dump truck body in accordance with the present invention is able to incorporate a conveyor system in the floor of the dump body, without the need for a plurality of longitudinally spaced cross member supports (i.e., transverse supports) attached, directly or indirectly, to the dump truck body floor. Therefore, the overall weight of the dump body of the present invention is decreased. Such a decrease in weight improves fuel efficiency of a truck including the dump body of the present invention. In addition, the elimination of a plurality cross member support from the floor structure of the dump body decreases the costs of manufacture. Further, the use of curved members which extend the full length of the side walls and floor surrounding the conveyor system in the dump truck body of the present invention provides a double wall and double floor design for additional strength and improves the flow of material within the dump truck body to the conveyor.

DETAILED DESCRIPTION OF THE INVENTION

A dump body 10 in accordance with the present invention is illustrated in FIGS. 1–12. The dump body 10 includes a front wall 12, a pair of opposing side walls 14 and 16, a floor 18 with sections 18a and 18b, a tailgate 20, a conveyor system 22, and an aperture 24. The dump body 10 provides a number of advantages, including decreased body weight leading to improved fuel efficiency, and ease of manufacture.

Figure 1:
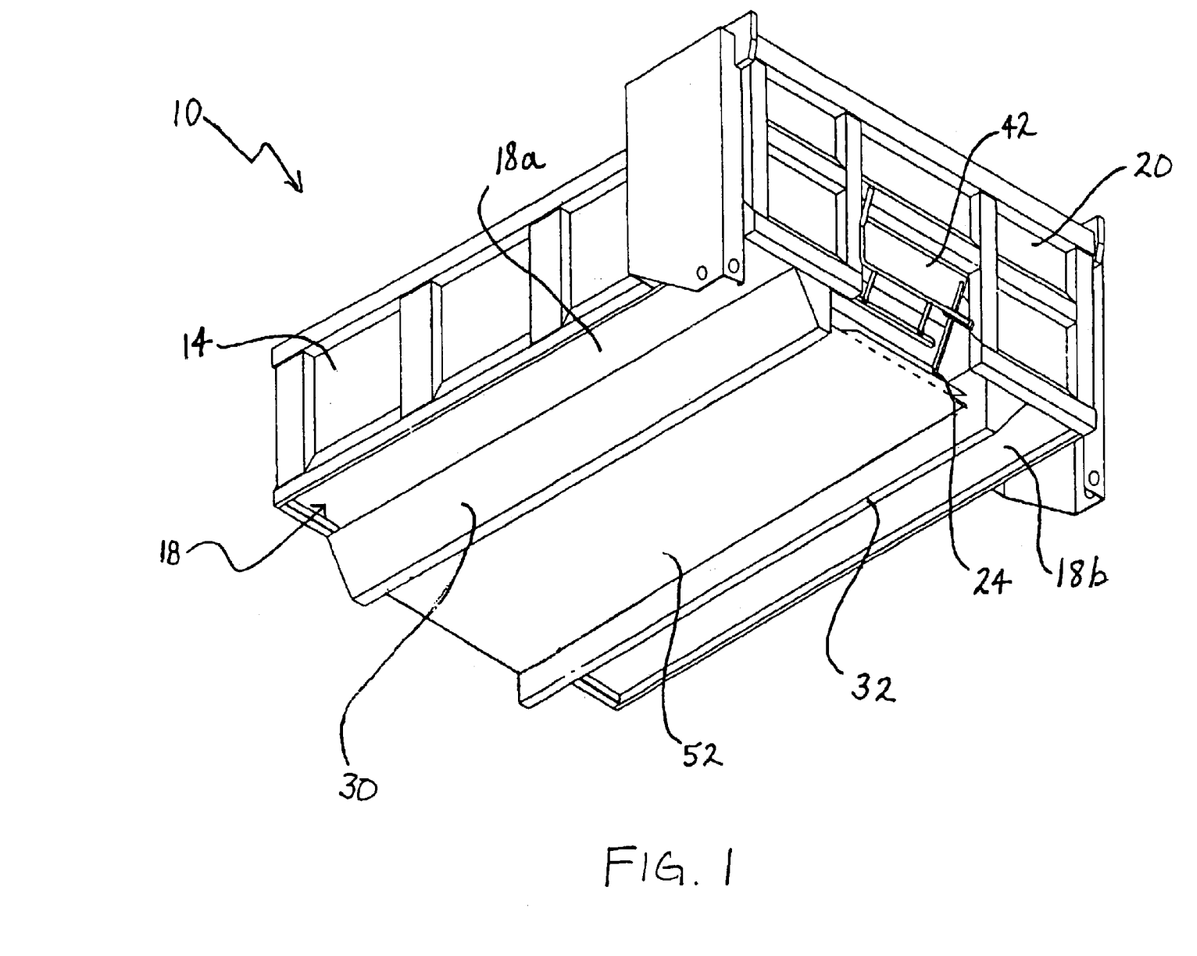
FIG. 1 is a perspective view of a dump body in accordance with the present invention.
Figure 2:
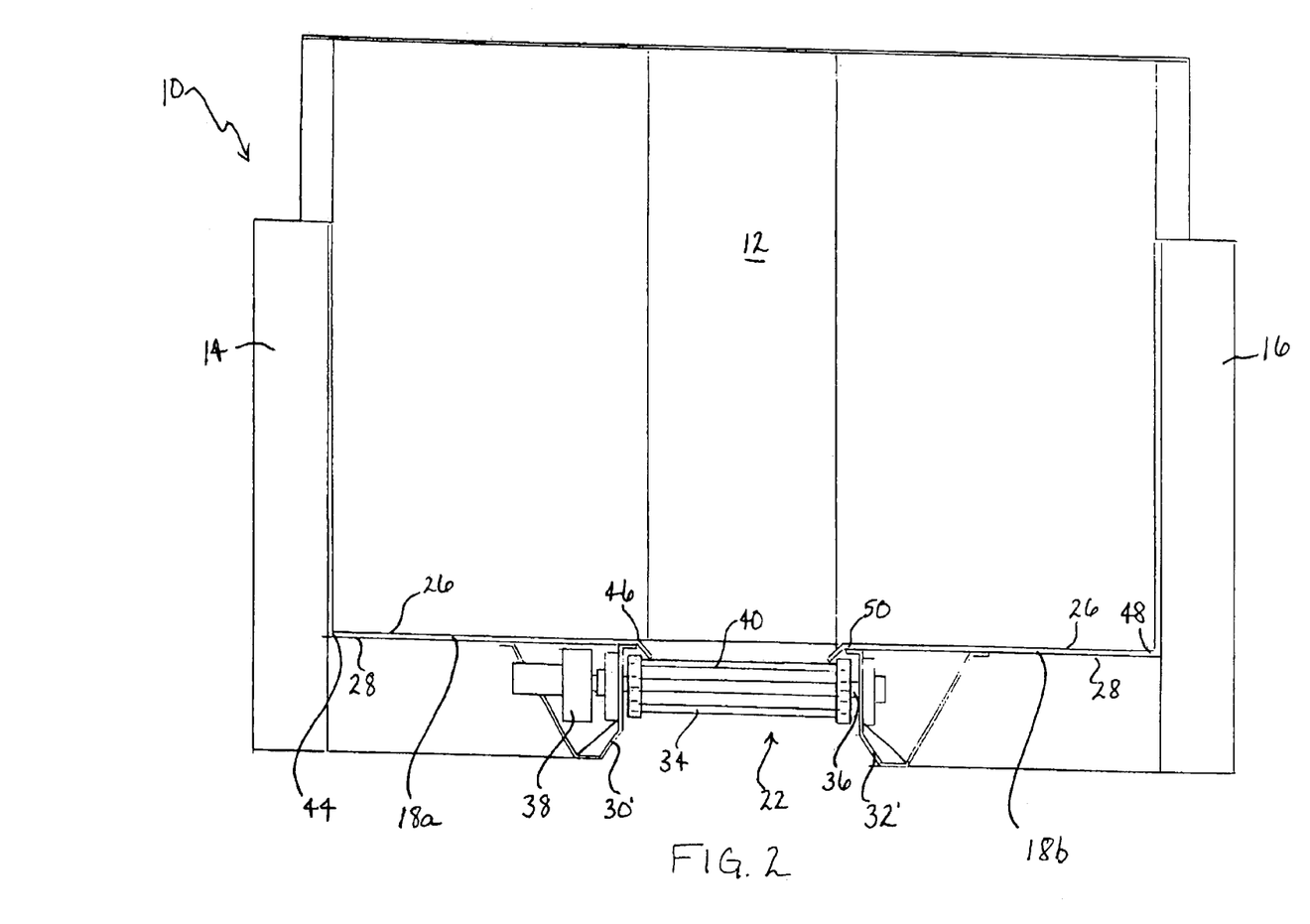
FIG. 2 is an enlarged, end view of a dump body in accordance with a second embodiment of the present invention.

Referring to FIGS. 1 and 2, dump body 10 includes front wall 12, opposing side walls 14 and 16, floor 18, and tailgate or back wall 20, which are connected together to form a receptacle. More specifically, front wall 12 is secured at approximately right angles along a lower edge to floor 18 and along opposing side edges to a front edge of each side wall 14 and 16. Tailgate 20 is perpendicularly secured to a back edge of each side wall 14 and 16. Each of the side walls 14 and 16 is secured at approximately right angles along a lower edge to a side of floor 18. Floor 18 includes an inner surface 26 and an outer surface 28. In an alternative embodiment, side walls 14 and 16 and tailgate 20 may be secured so that they do not extend substantially perpendicularly from floor 18.

The dump body 10, as shown in FIGS. 1 and 2, includes first and second, substantially parallel, longitudinal support structures 30 and 32 attached to the outer surface 28 of floor 18. In this embodiment, the first and second longitudinal support structures 30 and 32 extend longitudinally from the front wall 12 to the tailgate 20 and are welded to the outer surface 28 of floor 18. However, other attachment devices, such as rivets, bolts, screws, and adhesives, may be used to attach the support structures 30 and 32 to floor 18. In the embodiment shown in FIG. 1, the first and second, substantially parallel, longitudinal support structures 30 and 32 are in the form of trapezoidal support structures (i.e., are trapezoidal in cross-section). In another embodiment shown in FIG. 2, the first and second, substantially parallel, longitudinal support structures 30' and 32' are in the form of pentagonal support structures (i.e., have a pentagon as a cross-section). In these embodiments, the support structures 30 and 32 (and 30' and 32') are hollow, however, solid support structures may be used, if desired.

Referring to FIG. 2, a conveyor system 22 is attached to the first and second longitudinal support structures 30' and 32' and, therefore, is structurally integrated into the floor 18. In particular, the conveyor system 22 is attached directly to vertical sides of the support structures 30' and 32'.

In this particular embodiment, the conveyor system 22 includes an endless conveyor 34, front and rear sprocket shafts 36 which may be substantially identical, each having a pair of laterally spaced sprockets, a conveyor motor 38 for driving the conveyor 34, a power supply (not shown), and a control panel (not shown). Each sprocket shaft is rotatably secured to the parallel, longitudinal support members 30' and 32' of the dump body 10. One sprocket shaft is positioned below the aperture 24. The sprocket shafts rotate about an axis which is substantially parallel with front wall 12 and tailgate 20. Each end of each sprocket shaft has a set of radially extending teeth located around its circumference.

The conveyor 34 includes a pair of chains (not shown) which are secured together by bars 40 which extend in a substantially perpendicular direction between the chains and are spaced at substantially equal distances apart. The chains are wrapped around and extend between opposing shafts, with the teeth on one side of the sprocket shafts engaged to mesh with one chain, i.e. seated in openings in the chain, and the teeth on the opposing side of the sprocket shafts engaged to mesh with the other chain. In the embodiment shown in FIG. 2, conveyor 34 is integrated in or seated within a recess in floor 18, e.g., in this particular embodiment the recess is about one to two inches below the plane of floor 18, extends between front wall 12 and tailgate 20, and is centrally located between side walls 14 and 16.

Conveyor motor 38 is secured to dump body 10 and is coupled to one of the sprocket shafts 36 by a driving shaft. Motor 38 is also coupled to a power supply (not shown) and also to a control panel (not shown) which may be located in the cab of the truck including the dump truck body 10. When motor 38 is engaged, motor 38 rotates the drive shaft and sprocket shafts 36 driving conveyor 34. With the control panel, operations such as when the conveyor 34 is engaged, the direction in which conveyor 34 runs, and the rate at which conveyor 34 runs can be controlled in a manner well known to those skilled in the art. In this particular embodiment, an electric motor is used as the drive mechanism, although other systems for driving conveyor 34 could be used, such as a hydraulic system. By changing the direction of rotation of the driving shaft and thus of sprocket shafts 36, conveyor 34 can be operated to run in either direction, i.e. either towards the front wall 12 or towards the tailgate 20. As a result, the dump truck body 10 can be operated to convey materials to either the front or the back of the dump truck body 10.

Although one type of conveyor system 22 is described, any type of conveyor, such as the conveyors shown in U.S. Pat. No. 4,886,214 to Musso, Jr. et al., U.S. Pat. No. 5,310,119 to Musso, Jr. et al., and U.S. Pat. No. 5,397,172 to Musso, Jr. et al. which are hereby incorporated by reference in their entirety, could be used. Additionally, any type of conveyor or moving system, such as an auger system disclosed in U.S. Pat. No. 2,879,910 to Johnson and U.S. Pat. No. 5,927,617 to Musso, Jr. et al., which are hereby incorporated by reference in their entirety, could also be used.

The size and spacing of first and second, substantially parallel, longitudinal support members 30 and 32 (30' and 32') is determined by the conveyor system used. In this particular example, the first and second, substantially parallel, longitudinal support structures extend from the outer surface 28 of the floor 18 about twelve inches and are spaced approximately three feet apart on a floor having a width of about eight feet. In addition, in this particular embodiment, the conveyor system 22 is centrally located. However, the conveyor system 22 may be located at any position between side walls 14 and 16 and more than one conveyor system 22 may be used.

Figure 5:
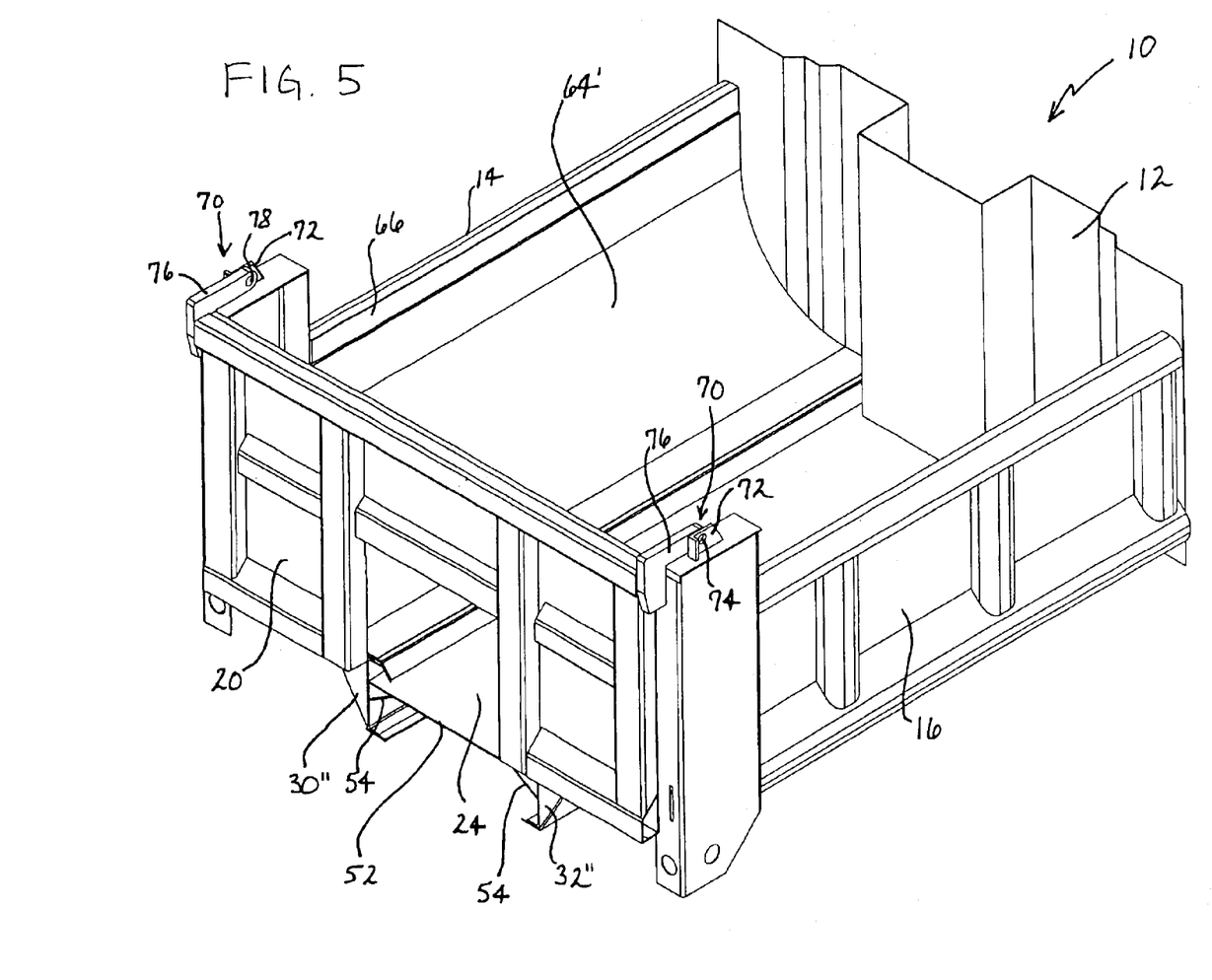
FIG. 5 is a perspective view of a dump body in accordance with a fourth embodiment of the present invention.
Figure 6:
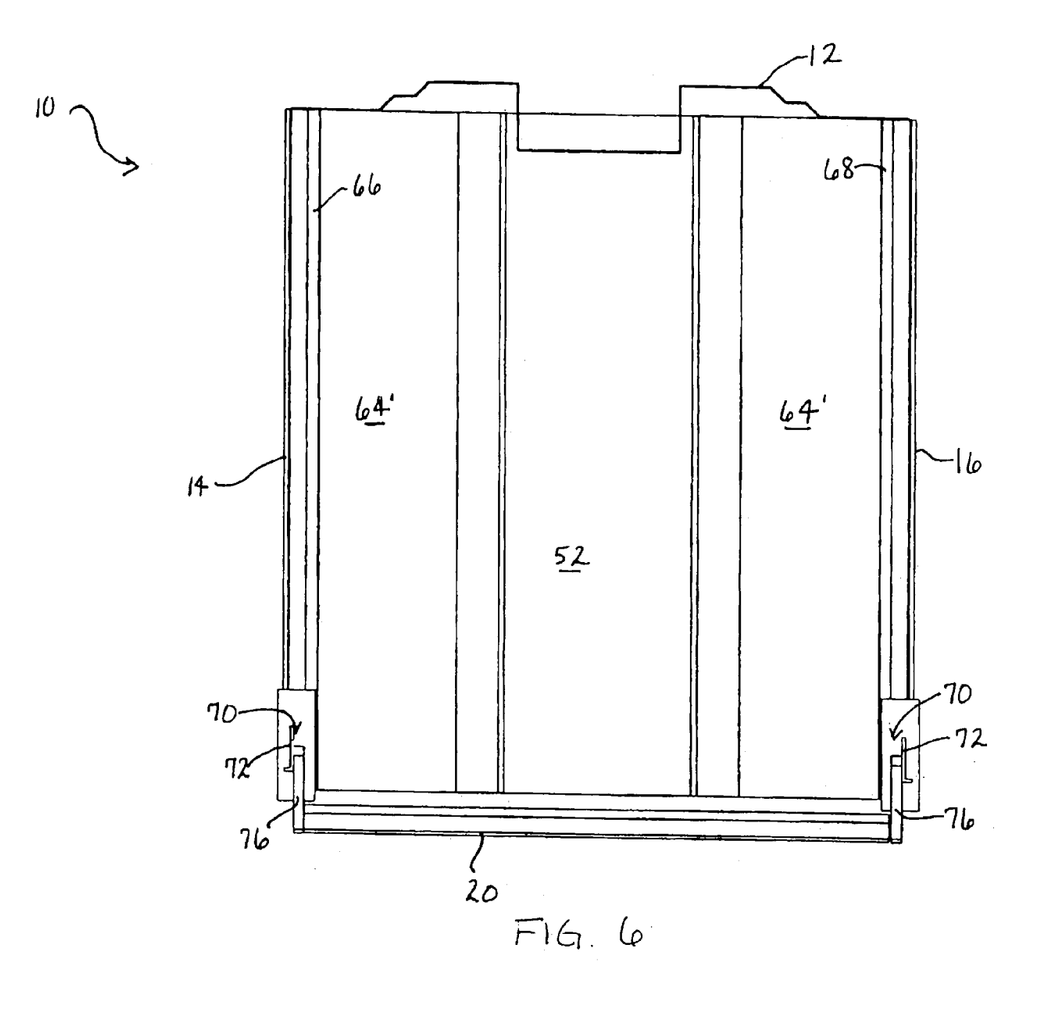
FIG. 6 is a top view of the dump body of FIG. 5.

Referring to FIGS. 1 and 5, tailgate 20 includes aperture 24. Aperture 24 extends through tailgate 20 to the interior of dump body 10. In this particular embodiment, one aperture 24 is present, although dump body 10 could be manufactured to have additional apertures 24, as needed or desired. The aperture 24 is in alignment with the end of conveyor system 22 for dispensing of material within the dump truck body. In an alternative embodiment, aperture 24 could be located in the floor, for example, when conveying material to the front of the truck body 10.

Referring to FIG. 1, a door 42 may be adjustably secured to tailgate 20 of dump body 10 between positions covering and exposing aperture 24. In particular, the door 42 is moveable between a first raised position exposing aperture 24 and resting above conveyor 34, as shown in FIG. 1, and a second lowered position covering the aperture 24 and resting on conveyor 34 by sliding door 42 down and towards conveyor 34. Door 42 may also be moved to intermediate positions between the first raised position and the second lowered position. Door 42 is used to control the size of aperture 24 which helps control the rate at which material in dump body 10 is dispensed.

Any type of door operating mechanism which can move the door 42 between the first and second positions, to intermediate positions between the first and second positions, and any kind of door locking mechanism can be used, such as in U.S. Pat. No. 5,397,172 to Musso Jr. et. al and U.S. Pat. No. 5,927,617 to Musso Jr. et al., which are hereby incorporated by reference in their entirety.

Referring to FIG. 2, the floor 18 comprises a longitudinally extending opening in alignment with the conveyor system 22. In particular, the floor 18 comprises first and second substantially planar sections 18a and 18b. The first substantially planar section 18a has a first end 44 adjacent and in contact with the first side wall 14 and a second end 46 adjacent and in contact with the first longitudinal support structure 30. The second substantially planar section 18b has a first end 48 adjacent and in contact with the second side wall 16 and a second end 50 adjacent and in contact with the second longitudinal support structure 32. The first and second substantially planar sections 18a, 18b define an opening extending therebetween. The opening is positioned over the conveyor system 22 and allows material within the dump truck body 10 to contact the conveyor system 22 for dispensing out of the dump truck body 10. Although this embodiment of the invention includes a single longitudinally extending opening, multiple openings could be used. Alternatively, the opening(s) may not extend the entire length of the floor 18 of the dump body 10.

As shown in FIG. 1, below the opening positioned over the conveyor system 22, a substantially planar support plate 52 is attached to and extends between vertical portions of the support structures 30 and 32. The substantially planar support plate 52 provides additional support for the conveyor system 22, is positioned to allow the conveyor chains to ride around and on it, and captures any material that falls through the conveyor system 22. Optional support members 54 may be attached to the substantially planar support plate 52 and the vertical portions of the first and second support structures 30 and 32, as shown in FIGS. 3 and 4.

Figure 3:
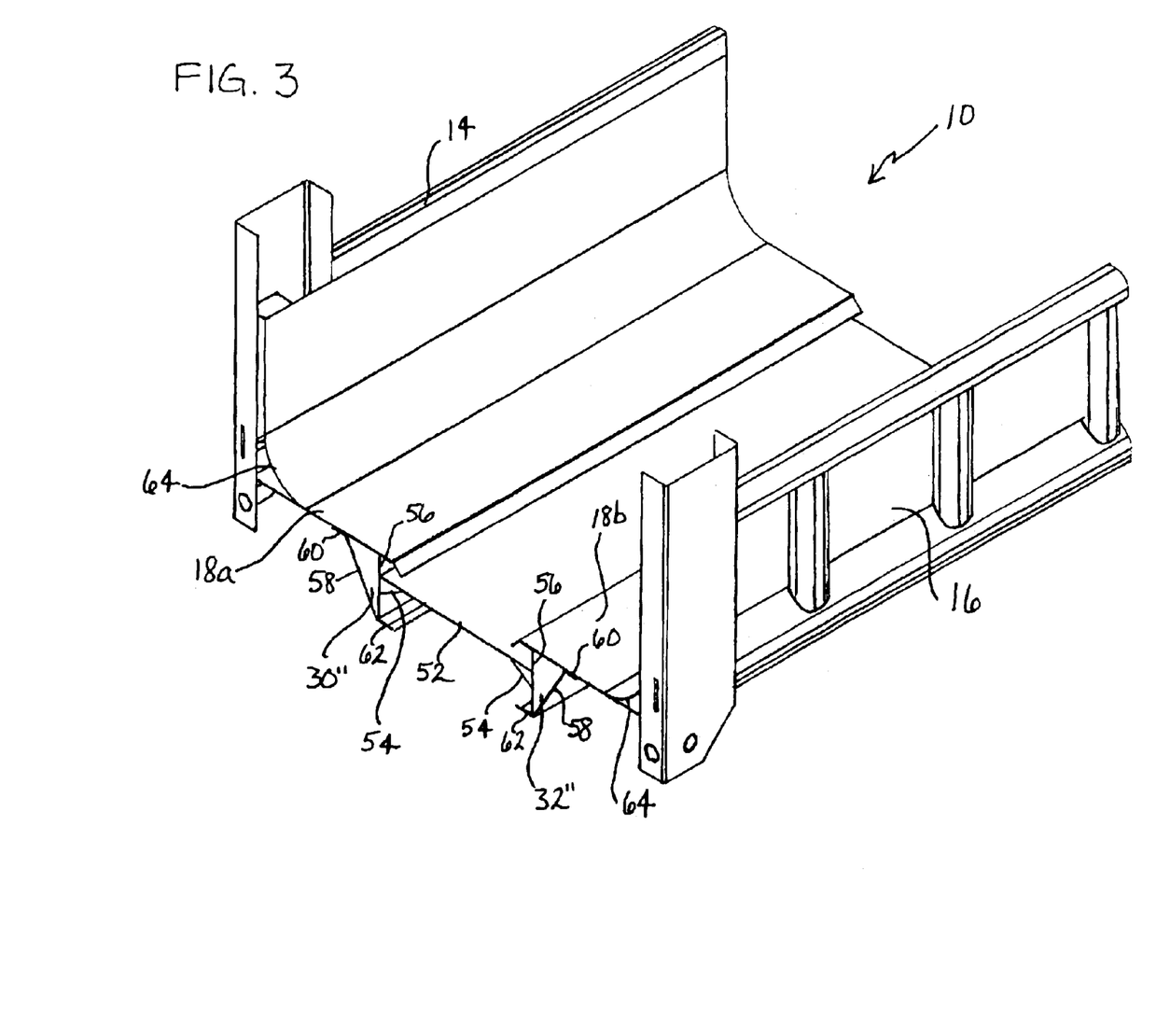
FIG. 3 is a partial, perspective view of a dump body in accordance with a third embodiment of the present invention.
Figure 4:
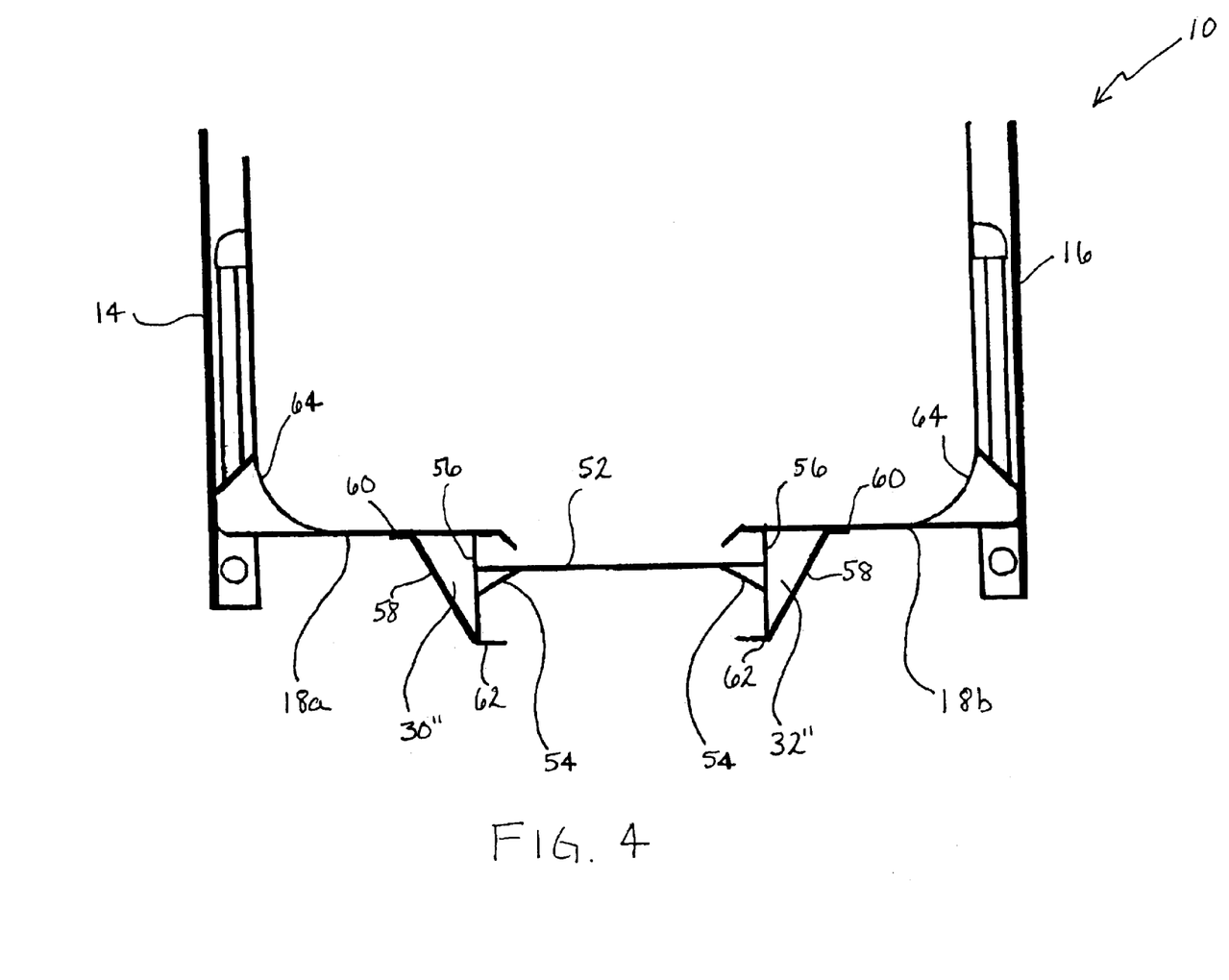
FIG. 4 is an end view of the dump body of FIG. 3.

A dump truck body 10 in accordance with a third embodiment of the present invention is shown in FIGS. 3 and 4. In this embodiment, the dump truck body 10 is identical to the above-described dump truck body, except as described below.

Referring to FIG. 3, in this particular example, the first and second, substantially parallel, longitudinal support structures 30" and 32" are triangular in cross-section and extend longitudinally from the front wall 12 to the tailgate 20. In particular, the first and second support structures 30" and 32" include a vertical portion 56 extending downwardly from the outer surface 28 of the floor and an elongated "Z-shaped" portion 58 having a first end 60 adjacent and in contact with the outer surface 28 of the floor 18 and a second end 62 adjacent and in contact with a lower edge of the vertical portion 56. As described above, a conveyor system 22 may be mounted directly to the vertical portions 56 of the support structures 30" and 32". Triangular, longitudinal support structures 30" and 32" in accordance with this embodiment of the present invention simplify the assembly of the dump truck body of the present invention.

In the embodiment shown in FIGS. 3 and 4, curved members 64 are located in the dump body 10 to direct the material contained within the dump body towards the centrally located conveyor system 22. The curved members 64 curve downwardly and inwardly toward the conveyor system 22 and are attached to the inner surface 26 of floor 18 and side walls 14 and 16. In particular, in this embodiment, curved members 64 extend partially along the inner surface 26 of floor 18 and partially up the side walls 14 and 16, such that at least a portion of the floor 18 and side walls 14 and 16 is not curved. In the embodiment shown in FIGS. 3 and 4, a majority of the inner surface 26 of floor 18 and side walls 14 and 16 is not curved. However, the extent of curvature of the curved members 64 along the inner surface 26 of floor 18 and side walls 14 and 16 can be varied as desired. In this particular embodiment, the curved members 64 are circular with a radius of from about two inches to about twenty inches. Further, in this particular example, the curved members 64 are permanently attached to both of the first and second side walls and the floor. However, one or both of the curved members 64 may be removably attached to the first and second side walls and the floor.

A dump truck body 10 in accordance with a fourth embodiment of the present invention is shown in FIGS. 5–9. In this embodiment, the dump truck body 10 is identical to the above-described dump truck body in accordance with the third embodiment of the present invention, except as described below.

In the embodiment shown in FIGS. 5–9, curved members 64' are located in the dump body 10 to direct the material contained within the dump body towards the centrally located conveyor system 22. In this particular example, a curved member 64' is attached adjacent and curves inwardly and downwardly from a first longitudinal edge 66 of the first side wall 14 to the floor adjacent the conveyor system 22 (i.e., the second end of floor 18a) and a curved member 64' is attached adjacent and curves inwardly and downwardly from a first longitudinal edge 68 of the second side wall 16 to the floor adjacent the conveyor system 22 (i.e., the second end of floor 18b). In this particular embodiment, the curved members 64' are circular with a radius of from about 24 inches to about 48 inches. The large radius interior side corners formed in accordance with this embodiment of the present invention provide a large radius slope to move material toward the centrally located conveyor system 22. In addition, the use of curved members 64' which extend substantially from first longitudinal edges 66, 68 of side walls 14 and 16 to the conveyor system 22 produces a double side wall and floor design, which provides additional strength for holding materials within the dump truck body 10. This further alleviates the need for cross member supports in the dump truck body of the present invention. In this particular example, one curved member 64' is attached to each side wall 14 and 16 and extends longitudinally along the length of the dump truck body 10. However, more than one curved member 64' may extend longitudinally along the length of each side wall of the dump truck body 10.

Figure 7:
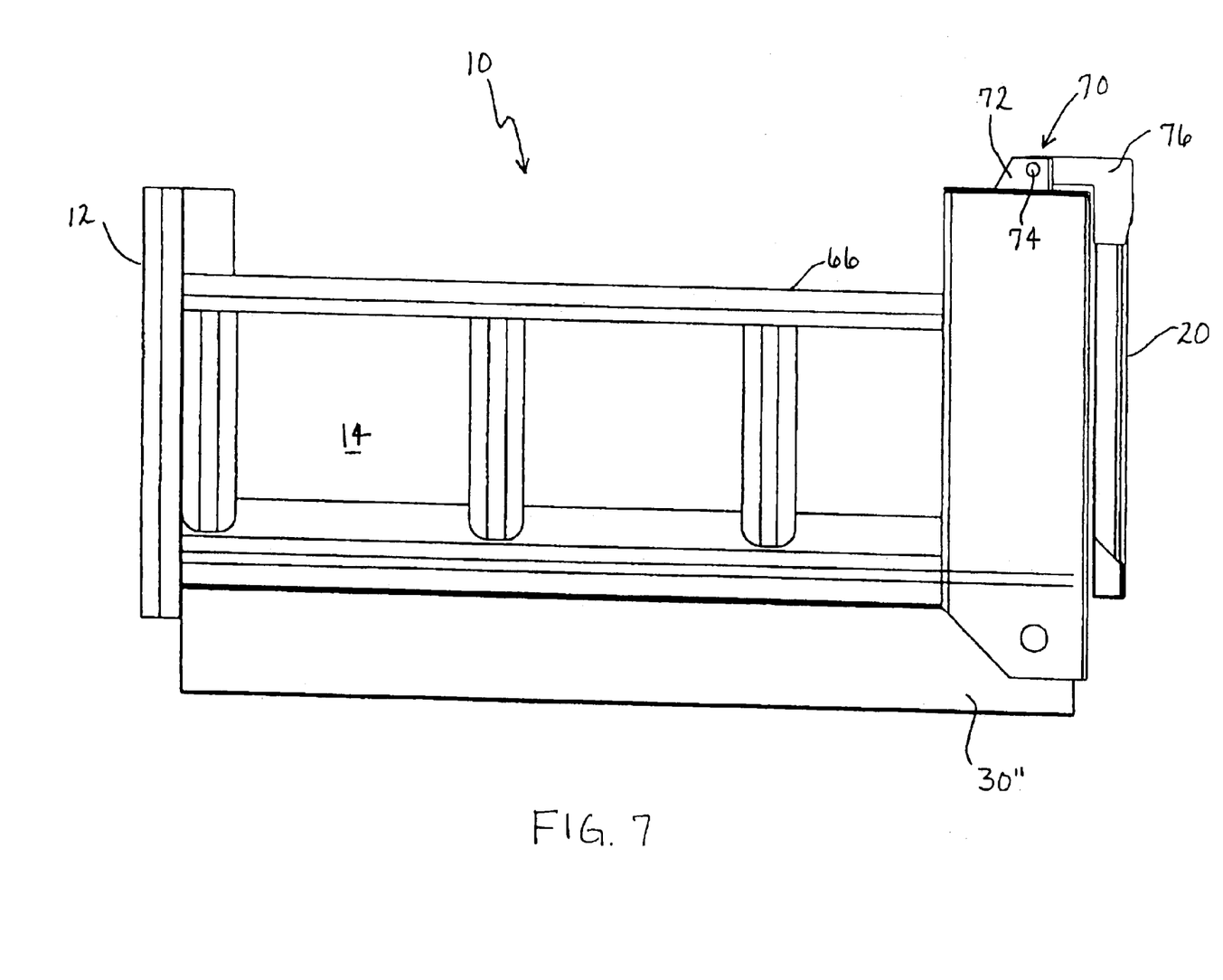
FIG. 7 is a side view of the dump body of FIG. 5.
Figure 8:
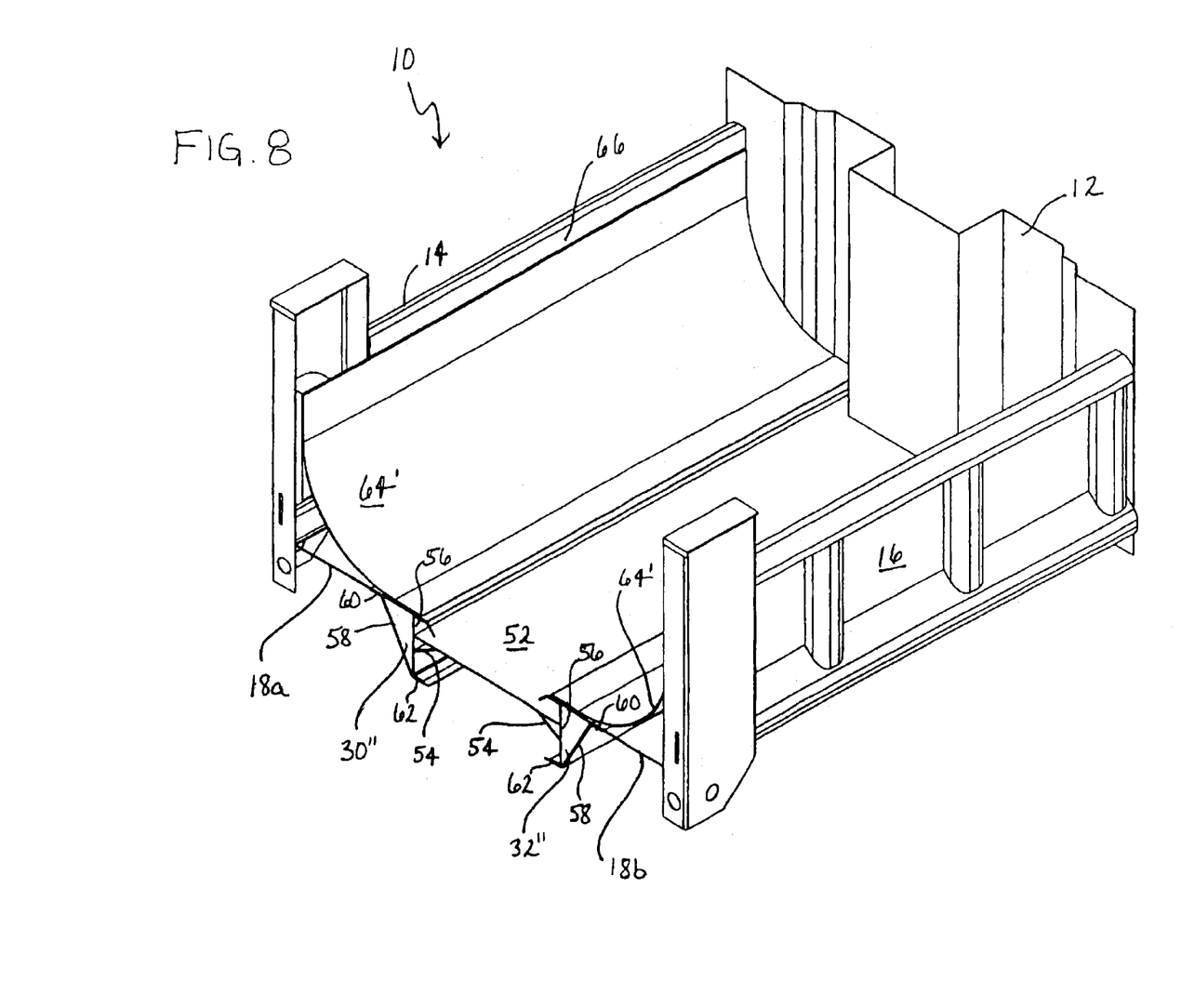
FIG. 8 is a partial, perspective view of the dump body of FIG. 5.
Figure 9:
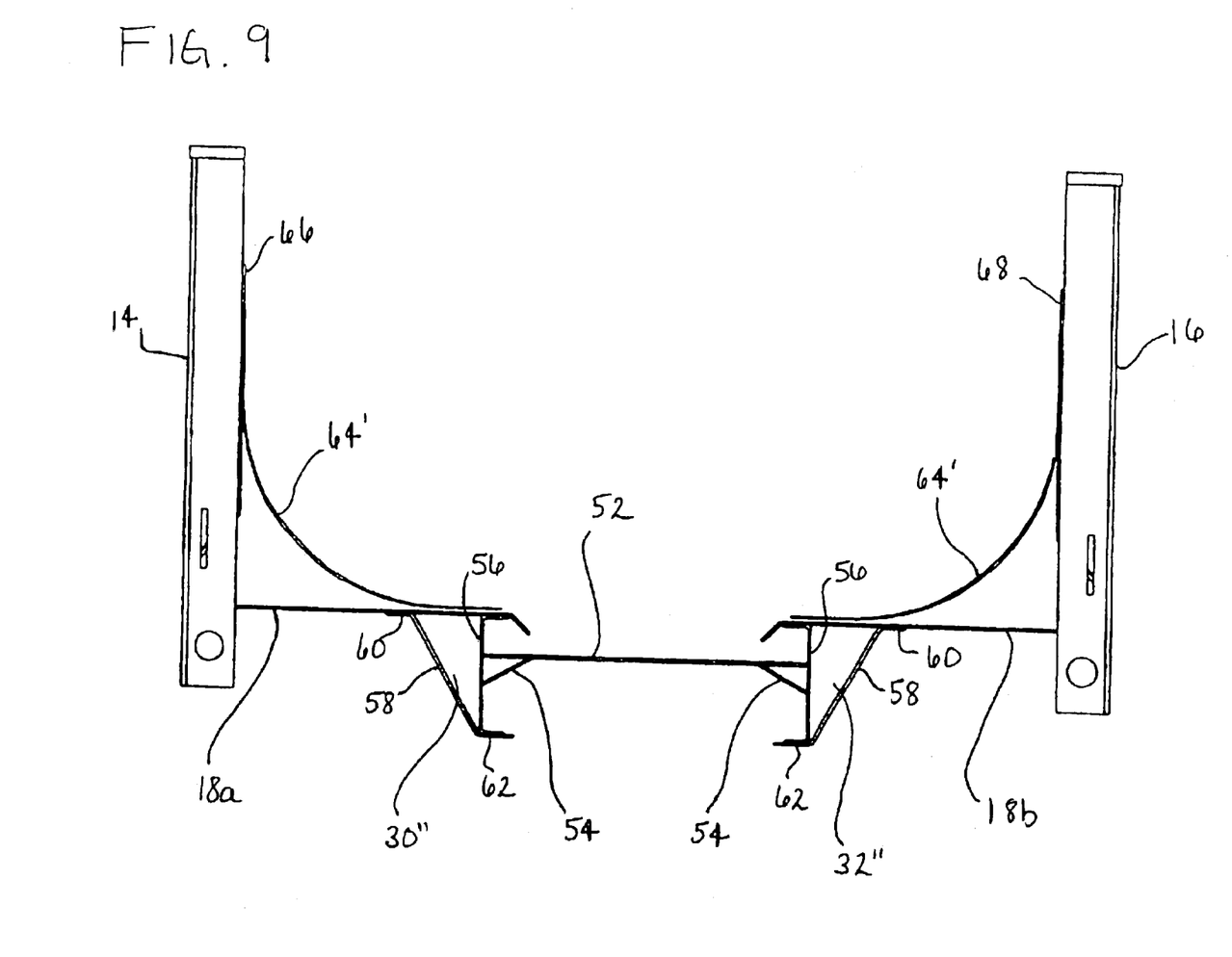
FIG. 9 is an end view of the dump body of FIG. 8.

Referring to FIGS. 5 and 7, tailgate 20 is pivotally mounted at pivot points or connections 70 to side walls 14 and 16. In this particular embodiment, each pivot point 70 includes a flange 72 with an opening 74, an L-shaped bracket 76, with an opening 78, and a pivot pin extending through the openings in the flange and L-shaped bracket (not shown). Each flange 72 extends upwardly from the top of each side wall 14 and 16 adjacent tailgate 20. Each flange 72 has an opening 74 designed to receive a pivot pin. The openings 74 in flanges 72 are located along the same transverse axis. A bracket 76, which in this particular embodiment has an L-shape, is secured at one end to each side of the top of the tailgate 20. The other end of each bracket 76 also has an opening 78 designed to receive a pivot pin. The opening 78 in each bracket 76 is aligned with the opening 74 in one of the flanges 72 and a pivot pin extends through the openings to create the pivotal point or connection 70. Pivot pins are held in place by a nut, cotter pin, or other securing device. Although one type of pivot connection or point 70 is disclosed, other types of pivotal connections or points could be used, such as that disclosed in U.S. Pat. No. 5,397,172 to Musso, Jr., et al., which is hereby incorporated by reference in its entirety. Although not shown, pivot points may also be provided at the bottom of the tailgate 20, if needed or desired.

In another alternative embodiment of the present invention, an auger system may be positioned in floor 18 of dump body 10 where the conveyor system 22 is now shown. Suitable auger systems are known in the art and are described, for example, in U.S. Pat. No. 5,927,617 to Musso, Jr. et al., which is hereby incorporated by reference in its entirety.

Figure 10:
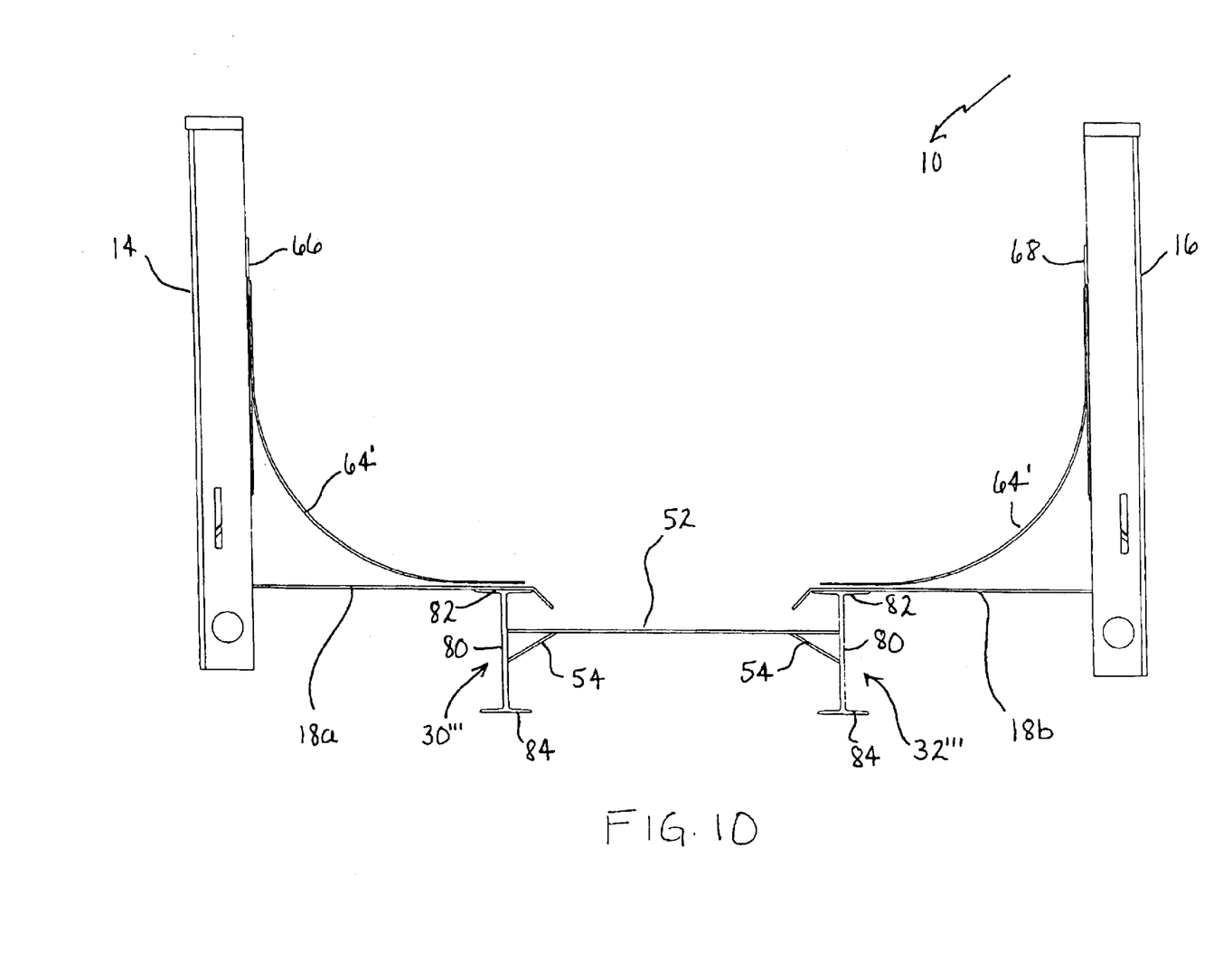
FIG. 10 is an end view of a dump body in accordance with a fifth embodiment of the present invention.

A dump truck body 10 in accordance with a fifth embodiment of the present invention is shown in FIG. 10. In this embodiment, the dump truck body 10 is identical to the above-described dump truck body, except as described below.

Referring to FIG. 10, in this particular example, the first and second, substantially parallel, longitudinal support structures 30''' and 32''' are H-beam longitudinals which extend from the front wall 12 to the tailgate 20. In particular, the first and second support structures 30''' and 32''' include a vertical portion 80 extending between first and second parallel, horizontal portions 82 and 84, wherein the first horizontal portion 82 is attached to the outer surface 28 of floor 18. As described above, a conveyor system 22 may be mounted directly to the vertical portions 80 of the support structures 30''' and 32'''.

The use of trapezoidal, pentagonal, triangular, or H-beam longitudinals as the longitudinal support structures for the truck body and the sides (i.e., supports) of the conveyor system, in accordance with the present invention, eliminates the need for a plurality of transverse support members (i.e., cross members supports) underneath the truck body floor. This, in turn, reduces the weight of the dump truck body and reduces manufacturing costs.

Figure 11:
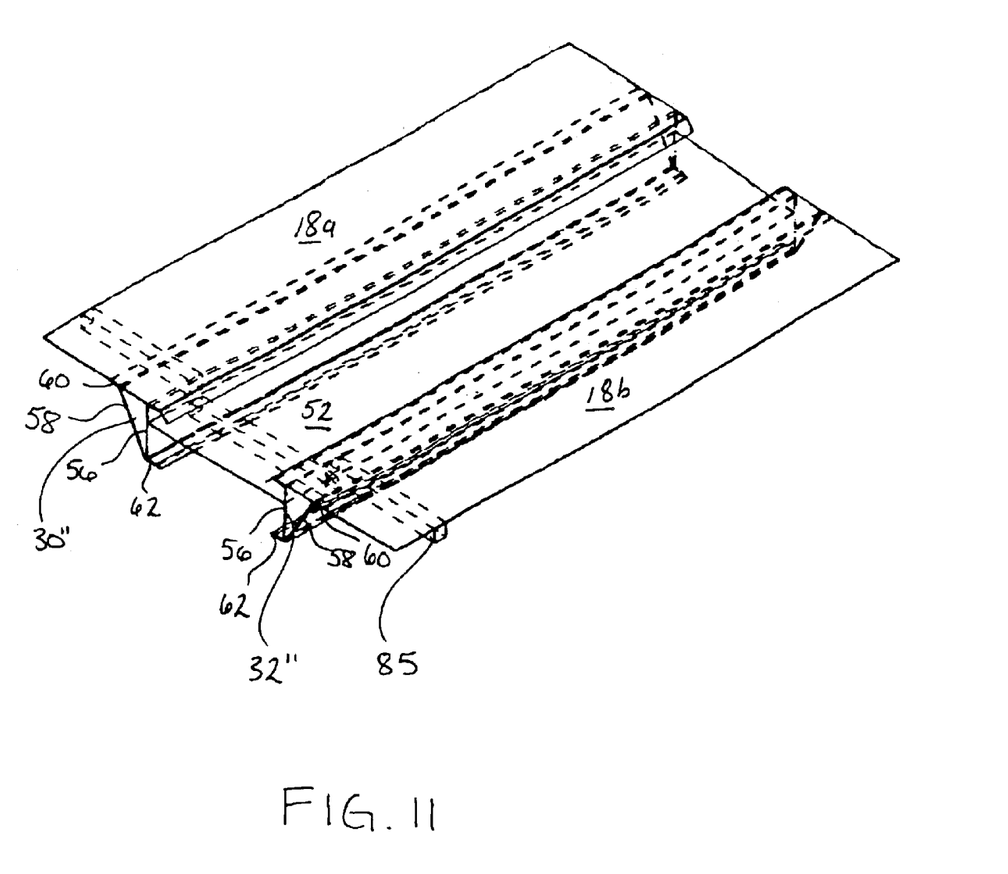
FIG. 11 is a partial, perspective view of the floor of a dump body in accordance with a sixth embodiment of the present invention.

As shown in FIG. 11, a single transverse support 85 may be attached to the outer surface 28 of floor 18 adjacent the tailgate 20. In this particular embodiment, transverse support 85 is attached to the outer surface 28 of floor 18 and between the substantially parallel, longitudinal support structures 30" and 32" approximately one foot from the tailgate 20. This cross member support 85 provides structural integrity for the truck body if the tailgate 20 is removable. However, if the tailgate 20 is not removable, transverse support 85 may be eliminated.

Figure 12:
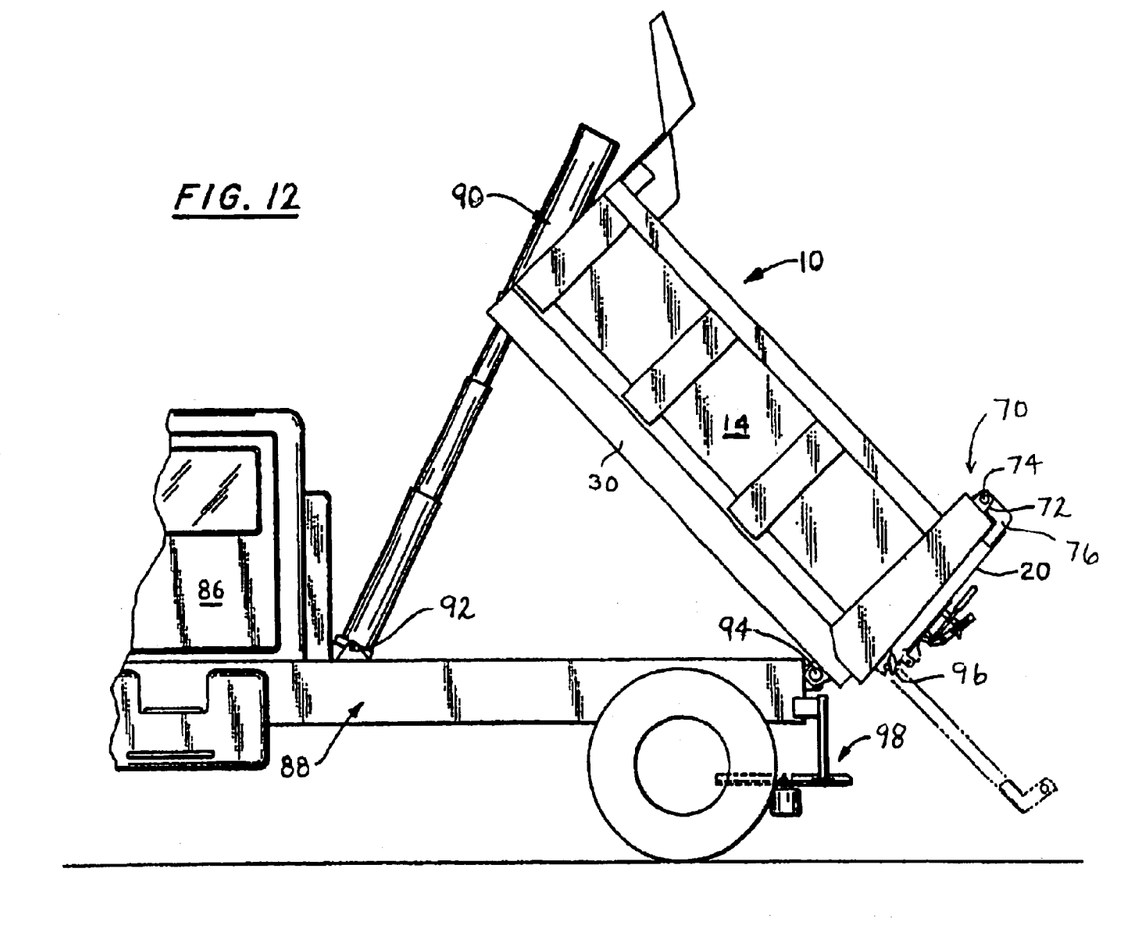
FIG. 12 is a side view of a truck including a dump body in accordance with the present invention.

Referring to FIG. 12, a truck 86 including a dump truck body 10 in accordance with the present invention is shown. The truck 86 includes a truck frame 88, a lift cylinder 90, and dump body 10.

As shown in FIG. 12, lift cylinder 90 is a telescoping lift cylinder which includes first, second, and third telescoping tubular sections. Second tubular section is seated within first tubular section and third tubular section is seated within second tubular section, and the lift cylinder can extend in and out in a manner well known to those skilled in the art. One end of first tubular section is pivotally mounted at a pivot point 92 to truck frame 88 and one end of the third tubular section is pivotally mounted at a pivot point (not shown) to the outer surface of front wall 12. In this particular embodiment, lift cylinder 90 is mounted to truck frame 88 and along the outside of front wall 12, although lift cylinder 90 could be mounted in other locations, such as beneath dump body 10. A lift cylinder system, such as those shown in U.S. Pat. No. 4,886,214 to Musso, Jr. et al., U.S. Pat. No. 5,310,119 to Musso, Jr. et al., U.S. Pat. No. 5,397,172 to Musso, Jr. et al., and U.S. Pat. No. 5,927,617 to Musso, Jr. et al., which are hereby incorporated by reference in their entirety, could be used. When lift cylinder 90 is raised, extending the second tubular section from the first tubular section and extending the third tubular section from the second tubular section, dump body 10 is raised to pivot up and around pivot points or connections 94. First and second, substantially parallel, longitudinal support structures 30 and 32 proximate to tailgate 20 are pivotally connected at pivot points or connections 94 to truck frame 88.

In the embodiment shown in FIG. 12, the lower end of tailgate 20 is secured by a latching system 96. Suitable latching systems are described, for example, in U.S. Pat. No. 5,397,172 to Musso Jr., et al. and U.S. Pat. No. 5,927,617 to Musso Jr., et al., which are hereby incorporated by reference in their entirety.

As shown in FIG. 12, a dispensing system 98 may be secured to the dump body 10 to provide a multiple purpose truck, which may be used in both a dump mode and a conveyor dispensing mode. Suitable dispensing systems include, but are not limited to, front and rear, rotary spreaders, such as those described in U.S. Pat. Nos. 4,886,214, 5,310,119, and 5,397,172, each to Musso Jr., et al., which are hereby incorporated by reference in their entirety.

The operation of truck 86 with dump body 10 in accordance with the present invention will be discussed with reference to FIGS. 1–12. Dump body 10 is filled with material, such as road salt, gravel, or soil. Truck 86 is driven to the location where the material needs to be dispensed. Depending upon the particular application, the operator opens door 42 in tailgate 20 (or opens door 42 in floor 18, when present). The amount the operator opens door 42 will impact the rate at which material is dispensed from dump body 10. The operator will then fasten or lock door 42 in place.

The operator will then engage the conveyor system 22 (or auger) to begin conveying in the direction of open door 42. The material in the dump body 10 is conveyed through the aperture 24 in the tailgate (or in floor 18) with the open door 42. If truck 86 has a spreader system, the operator will also engage the spreader system. If present, the spreader is disposed beneath aperture 24 and material from aperture 24 falls onto the spreader and is dispersed.

When the contents in dump body 10 adjacent tailgate 20 are dispersed or nearly dispersed, the operator will stop the truck 10, disengage conveyor system 22 (or the auger) and spreader system, and raise lift cylinder 90 to raise dump body 10 around pivot points 94, as shown in FIG. 12. Raising dump body 10 redistributes the material in dump body 10 to the rear of truck 86 and adjacent tailgate 20. Once the material is redistributed, dump body 10 is lowered and the operator can resume the operations discussed above.

Although the invention has been described in detail for the purpose of illustration, it is understood that such detail is solely for that purpose, and variations can be made therein by those skilled in the art without departing from the spirit and scope of the invention which is defined by the following claims.

What is claimed is:

1. A dump truck body comprising:
    a receptacle defined by a floor and, extending from the floor, first and second side walls on opposite sides of the floor, and a front wall and a tailgate, located on opposite sides of the floor and extending between the side walls;
    the floor comprising at least one longitudinal support structure which substantially extends from the front wall to the tailgate, a substantially planar support plate attached along an intermediate portion of the at least one longitudinal support structure, and at least one floor section extending in a substantially horizontal plane attached to the at least one longitudinal support structure, without a plurality of longitudinally spaced, transverse supports extending from the at least one longitudinal support structure to a side of the dump truck body;
    a conveyor system attached to the at least one longitudinal support structure, the floor having at least one opening in alignment with the conveyor system;
    wherein said dump truck body is adapted for pivotal attachment to a dump truck frame; and
    wherein the cross-sectional share of the at least one longitudinal support structure is selected from the group consisting of trapezoidal, triangular, and H-shaped.

2. The dump truck body according to claim 1 wherein the floor comprises two longitudinal support structures which are transversely spaced and substantially parallel.

3. The dump truck body according to claim 1 wherein the cross-sectional shape of the at least one longitudinal support structure is trapezoidal.

4. The dump truck body according to claim 1 wherein the cross-sectional shape of the at least one longitudinal support structure is triangular.

5. The dump truck body according to claim 1 wherein the cross-sectional shape of at least one longitudinal support structure is H-shaped.

6. The dump truck body according to claim 1 further comprising at least one first curved member adjacent and in contact with the first side wall and an inner surface of the floor, wherein the at least one first curved member curves downwardly and inwardly toward the conveyor system.

7. The dump truck body according to claim 6 further comprising at least one second curved member adjacent and in contact with the second side wall and the inner surface of the floor, wherein the at least one second curved member curves downwardly and inwardly toward the conveyor system.

8. The dump truck body according to claim 7 wherein the at least one first and second curved members are removable.

9. The dump truck body according to claim 7 wherein the at least one first and second curved members are permanently attached to either or both of the first and second side walls and the floor.

10. The dump truck body according to claim 7 wherein the first and second side walls have a first longitudinal edge distal from the floor and a second longitudinal edge proximal to the floor and wherein the at least one first curved member extends from the first longitudinal edge of the first side wall to the floor adjacent the conveyor system and the at least one second curved member extends from the first longitudinal edge of the second side wall to the floor adjacent the conveyor system.

11. A dump truck body comprising:
    a receptacle defined by a floor and, extending from the floor, first and second side walls on opposite sides of the floor, and a front wall and a tailgate, located on opposite sides of the floor and extending between the side walls;
    the floor comprising at least one longitudinal support structure which substantially extends from the front wall to the tailgate, a substantially planar support plate attached along an intermediate portion of the at least one longitudinal support structure, and at least one floor section extending in a substantially horizontal plane attached to the at least one longitudinal support structure, without a plurality of longitudinally spaced, transverse supports extending from the at least one longitudinal support structure to a side of the dump truck body;
    a conveyor system attached to the at least one longitudinal support structure, the floor having at least one opening in alignment with the conveyor system;
    a transverse support attached to the at least one longitudinal support structure and the at least one floor section adjacent the tailgate; and
    wherein said dump truck body is adapted for pivotal attachment to a dump truck frame.

12. A dump truck comprising:
    a longitudinally extending truck frame;
    a dump truck body pivotally mounted at a rear end thereof on the truck frame, wherein the dump truck body comprises:
        a receptacle defined by a floor and, extending from the floor, first and second side walls on opposite sides of the floor, and a front wall and a tailgate, located on opposite sides of the floor and extending between the side walls;
        the floor comprising at least one longitudinal support structure which substantially extends from the front wall to the tailgate, a substantially planar support plate attached along an intermediate portion of the at least one longitudinal support structure, and at least one floor section extending in a substantially horizontal plane attached to the at least one longitudinal support structure, without a plurality of longitudinally spaced, transverse supports extending from the at least one longitudinal support structure to a side of the dump truck body; and
        a conveyor system attached to the at least one longitudinal support structure, the floor having at least one opening in alignment with the conveyor system;
    a lift system connected between the truck frame and a forward end the dump body; and
    wherein the cross-sectional shape of the at least one longitudinal support structure is selected from the group consisting of trapezoidal, triangular, and H-shaped.

13. The dump truck according to claim 12 wherein the floor comprises two longitudinal support structures which are transversely spaced and substantially parallel.

14. The dump truck according to claim 12 wherein the cross-sectional shape of the at least one longitudinal support structure is trapezoidal.

15. The dump truck according to claim 12 wherein the cross-sectional shape of the at least one longitudinal support structure is triangular.

16. The dump truck according to claim 12 wherein the cross-sectional shape of the at least one longitudinal support structure is H-shaped.

17. The dump truck according to claim 12 wherein the dump truck body further comprises at least one first curved member adjacent and in contact with the first side wall and an inner surface of the floor, wherein the at least one first curved member curves downwardly and inwardly toward the conveyor system.

18. The dump truck according to claim 17 wherein the dump truck body further comprises at least one second curved member adjacent and in contact with the second side wall and the inner surface of the floor, wherein the at least one second curved member curves downwardly and inwardly toward the conveyor system.

19. The dump truck according to claim 18 wherein the at least one first and second curved members are removable.

20. The dump truck according to claim 18 wherein the at least one first and second curved members are permanently attached to either or both of the first and second side walls and the floor.

21. The dump truck according to claim 18 wherein the first and second side walls have a first longitudinal edge distal from the floor and a second longitudinal edge proximal to the floor and wherein the at least one first curved member extends from the first longitudinal edge of the first side wall to the floor adjacent the conveyor system and the at least one second curved member extends from the first longitudinal edge of the second side wall to the floor adjacent the conveyor system.

22. A dump truck comprising:
 a longitudinally extending truck frame;
 a dump truck body pivotally mounted at a rear end thereof on the truck frame, wherein the dump truck body comprises:
  a receptacle defined by a floor and, extending from the floor, first and second side walls on opposite sides of the floor, and a front wall and a tailgate, located on opposite sides of the floor and extending between the side walls;
  the floor comprising at least one longitudinal support structure which substantially extends from the front wall to the tailgate, a substantially planar support plate attached along an intermediate portion of the at least one longitudinal support structure, and at least one floor section extending in a substantially horizontal plane attached to the at least one longitudinal support structure, without a plurality of longitudinally spaced, transverse supports extending from the at least one longitudinal support structure to a side of the dump truck body; and
  a conveyor system attached to the at least one longitudinal support structure, the floor having at least one opening in alignment with the conveyor system; and
  a transverse support attached to the at least one longitudinal support structure and the at least one floor section adjacent the tailgate; and
 a lift system connected between the truck frame and a forward end of the dump body.

* * * * *

UNITED STATES PATENT AND TRADEMARK OFFICE
CERTIFICATE OF CORRECTION

PATENT NO. : 6,960,055 B2
DATED : November 1, 2005
INVENTOR(S) : Charles S. Musso Jr. et al.

It is certified that error appears in the above-identified patent and that said Letters Patent is hereby corrected as shown below:

Column 9,
Line 39, delete "share" and substitute -- shape --.

Signed and Sealed this

Seventh Day of February, 2006

JON W. DUDAS
*Director of the United States Patent and Trademark Office*